US012634068B2

(12) United States Patent
Matsumura et al.

(10) Patent No.: US 12,634,068 B2
(45) Date of Patent: May 19, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 502 days.

(21) Appl. No.: 18/040,213

(22) PCT Filed: Aug. 4, 2020

(86) PCT No.: PCT/JP2020/029870
§ 371 (c)(1),
(2) Date: Feb. 1, 2023

(87) PCT Pub. No.: WO2022/029899
PCT Pub. Date: Feb. 10, 2022

(65) Prior Publication Data
US 2023/0269043 A1    Aug. 24, 2023

(51) Int. Cl.
H04L 5/00        (2006.01)
(52) U.S. Cl.
CPC .................................. H04L 5/0048 (2013.01)
(58) Field of Classification Search
CPC ...................................................... H04L 5/0048
See application file for complete search history.

(56) References Cited

U.S. PATENT DOCUMENTS

| 2019/0356445 A1* | 11/2019 | Manolakos | .......... H04B 7/0805 |
| 2021/0242991 A1* | 8/2021 | Manolakos | ........... H04L 5/0094 |
| 2022/0029764 A1* | 1/2022 | Liou | ..................... H04L 5/0094 |

FOREIGN PATENT DOCUMENTS

| CN | 111262679 A | * | 6/2020 | ........... H04B 7/0691 |
| CN | 111405663 A | * | 7/2020 | ........... H04B 7/0404 |
| WO | 2019189751 A1 | | 10/2019 | |

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
3GPP TSG-RAN WG2 Meeting #109-e; R2-2001935 "[Offline-611][POS] Summary on support of non-periodic SRS cases" Huawei, HiSilicon; Online, Feb. 24-Mar. 6, 2020 (13 pages).
International Search Report issued in International Application No. PCT/JP2020/029870, mailed Mar. 23, 2021 (3 pages).
Written Opinion issued in International Application No. PCT/JP2020/029870; Dated Mar. 23, 2021 (3 pages).
(Continued)

*Primary Examiner* — Duc C Ho
(74) *Attorney, Agent, or Firm* — Osha Bergman Watanabe & Burton LLP

(57) ABSTRACT
A terminal according to one aspect of the present disclosure includes: a receiving section that receives a medium access control-control element (MAC CE) related to a parameter for a sounding reference signal (SRS) resource set or an SRS resource; and a control section that controls SRS transmission, based on the parameter. According to one aspect of the present disclosure, it is possible to flexibly control an SRS parameter.

6 Claims, 17 Drawing Sheets

(56)            References Cited

OTHER PUBLICATIONS

Office Action issued in Chinese Application No. 202080105882.1, mailed Jul. 4, 2024 (11 pages).
Office Action issued in Japanese Application No. 2022-541385, mailed Jul. 30, 2024 (6 pages).
Office Action issued in Japanese Application No. 2022-541385, dated Dec. 17, 2024 (6 pages).
3GPP TSG RAN WG1 Meeting 91; R1-1720767; Huawei, HiSilicon; "On SRS antenna switching"; Reno, USA; Nov. 27-Dec. 1, 2017 (5 pages).
3GPP Tsg-Ran Meeting #88e; RP-200939; MediaTek Inc .; "Motivation to introduce new R17 Wi on further RRM enhancement"; Electronic Meeting; Jun. 29 - Jul. 3, 2020 (10 pages).
Office Action issued in Chinese Patent Application No. 202080105882. 1, issued Apr. 10, 2025 (12 pages).

\* cited by examiner

| Value of SRS request field | Triggered aperiodic SRS resource set(s) for DCI format 0_1, 0_2, 1_1, 1_2, and 2_3 configured with higher layer parameter *srs-TPC-PDCCH-Group* set to 'typeB' | Triggered aperiodic SRS resource set(s) for DCI format 2_3 configured with higher layer parameter *srs-TPC-PDCCH-Group* set to 'typeA' |
|---|---|---|
| 00 | No aperiodic SRS resource set triggered | No aperiodic SRS resource set triggered |
| 01 | SRS resource set(s) configured with higher layer parameter *aperiodicSRS-ResourceTrigger* set to 1 or an entry in *aperiodicSRS-ResourceTriggerList* set to 1 | SRS resource set(s) configured with higher layer parameter *usage* in *SRS-ResourceSet* set to 'antennaSwitching' and *resourceType* in *SRS-ResourceSet* set to 'aperiodic' for a 1st set of serving cells configured by higher layers, or<br><br>SRS resource set(s) configured by [SRS-ResourceSetForPositioning] and *resourceType* in [SRS-ResourceSetForPositioning] set to 'aperiodic' for a 1st set of serving cells configured by higher layers |
| 10 | SRS resource set(s) configured with higher layer parameter *aperiodicSRS-ResourceTrigger* set to 2 or an entry in *aperiodicSRS-ResourceTriggerList* set to 2 | SRS resource set(s) configured with higher layer parameter *usage* in *SRS-ResourceSet* set to 'antennaSwitching' and *resourceType* in *SRS-ResourceSet* set to 'aperiodic' for a 2nd set of serving cells configured by higher layers, or<br><br>SRS resource set(s) configured by [SRS-ResourceSetForPositioning] and *resourceType* in [SRS-ResourceSetForPositioning] set to 'aperiodic' for a 2nd set of serving cells configured by higher layers |
| 11 | SRS resource set(s) configured with higher layer parameter *aperiodicSRS-ResourceTrigger* set to 3 or an entry in *aperiodicSRS-ResourceTriggerList* set to 3 | SRS resource set(s) configured with higher layer parameter *usage* in *SRS-ResourceSet* set to 'antennaSwitching' and *resourceType* in *SRS-ResourceSet* set to 'aperiodic' for a 3rd set of serving cells configured by higher layers, or<br><br>SRS resource set(s) configured by [SRS-ResourceSetForPositioning] and *resourceType* in [SRS-ResourceSetForPositioning] set to 'aperiodic' for a 3rd set of serving cells configured by higher layers |

PRIOR ART

FIG. 1

| Value of SRS request field | Triggered aperiodic SRS resource set(s) for DCI format 0_2 and 1_2 |
|---|---|
| 0 | No aperiodic SRS resource set triggered |
| 1 | SRS resource set(s) configured with higher layer parameter *aperiodicSRS-ResourceTrigger* set to 1 or an entry in *aperiodicSRS-ResourceTriggerList* set to 1 |

PRIOR ART

FIG. 2

| R | Serving Cell ID | BWP ID | Oct. 1 |
| SRS resource set ID | SlotOffset | | Oct. 2 |
| Slot Offset | R | R | R | R | R | R | Oct. 3 |

| R | Serving Cell ID | BWP ID | Oct. 1 |
| SRS resource set ID | SlotOffset | | Oct. 2 |

| R | Serving Cell ID | BWP ID | Oct. 1 |
| SRS resource set ID | SlotOffset | | Oct. 2 |
| Slot Offset | R | R | R | R | R | R | Oct. 3 |

Variable size

SlotOffsetList = (0, 1, 2, 3, 4, 6, 8, 10, 12, 16, 20, ... ,32)

List index:     1, 2, 3, 4, 5, 6, 7, 8, ...                    ,16

| R | Serving Cell ID | | BWP ID | Oct. 1 |
|---|---|---|---|---|
| SRS resource set ID | | SlotOffset | | Oct. 2 |

List index

| Value of SRS request field | Triggered aperiodic SRS resource set(s) for DCI format 0_1, 0_2, 1_1, 1_2, and 2_3 |
|---|---|
| 00 | No aperiodic SRS resource set triggered |
| 01 | First SRS resource set ID(s) notified by MAC CE |
| 10 | Second SRS resource set ID(s) notified by MAC CE |
| 11 | Third SRS resource set ID(s) notified by MAC CE |

FIG. 8A

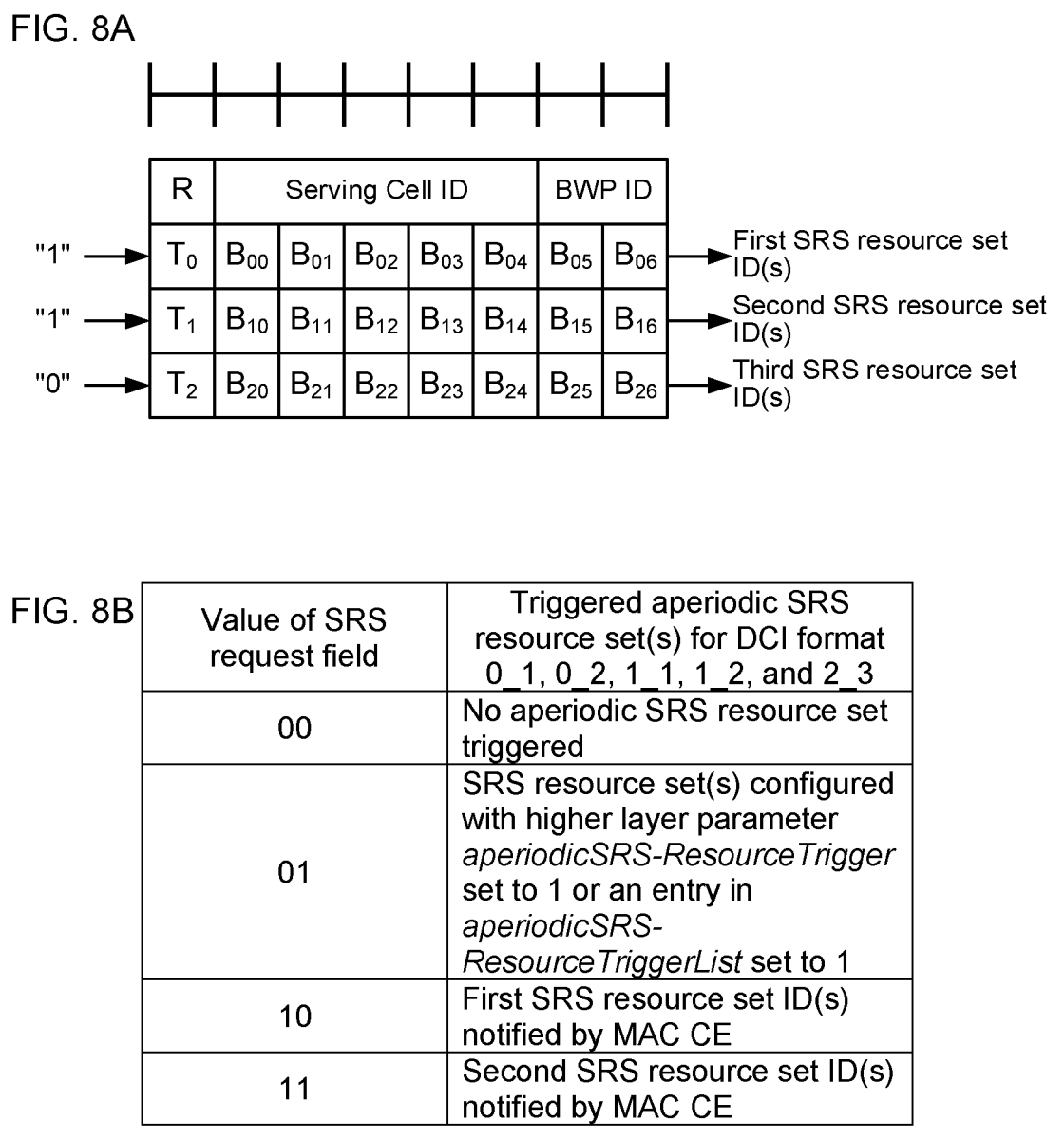

| R | Serving Cell ID | | | | | BWP ID | |
|---|---|---|---|---|---|---|---|
| $T_0$ | $B_{00}$ | $B_{01}$ | $B_{02}$ | $B_{03}$ | $B_{04}$ | $B_{05}$ | $B_{06}$ |
| $T_1$ | $B_{10}$ | $B_{11}$ | $B_{12}$ | $B_{13}$ | $B_{14}$ | $B_{15}$ | $B_{16}$ |
| $T_2$ | $B_{20}$ | $B_{21}$ | $B_{22}$ | $B_{23}$ | $B_{24}$ | $B_{25}$ | $B_{26}$ |

"1" → $T_0$ ... → First SRS resource set ID(s)

"1" → $T_1$ ... → Second SRS resource set ID(s)

"0" → $T_2$ ... → Third SRS resource set ID(s)

FIG. 8B

| Value of SRS request field | Triggered aperiodic SRS resource set(s) for DCI format 0_1, 0_2, 1_1, 1_2, and 2_3 |
|---|---|
| 00 | No aperiodic SRS resource set triggered |
| 01 | SRS resource set(s) configured with higher layer parameter *aperiodicSRS-ResourceTrigger* set to 1 or an entry in *aperiodicSRS-ResourceTriggerList* set to 1 |
| 10 | First SRS resource set ID(s) notified by MAC CE |
| 11 | Second SRS resource set ID(s) notified by MAC CE |

SRS resource set IDs list configured by RRC
  index #0 = {SRS set #0}
  index #1 = {SRS set #0, SRS set #1}
  index #2 = {SRS set #0, SRS set #1, SRS set #2}
  index #3 = {SRS set #1, SRS set #2, SRS set #3}

| R | Serving Cell ID | BWP ID |
|---|---|---|
| $T_0$ | List index | |
| $T_1$ | List index | |
| $T_2$ | List index | |

SRS resource set IDs list configured by RRC

Second SRS resource set ID(s)

Third SRS resource set ID(s)

Rel.15/16

| Value of SRS request field | Triggered aperiodic SRS resource set(s) |
|---|---|
| 00 | No aperiodic SRS resource set triggered |
| 01 | SRS resource set(s) configured with *aperiodicSRS-ResourceTrigger*=1 |
| 10 | SRS resource set(s) configured with *aperiodicSRS-ResourceTrigger*=2 |
| 11 | SRS resource set(s) configured with *aperiodicSRS-ResourceTrigger*=3 |

Alt.2

| Value of SRS request field | Triggered aperiodic SRS resource set(s) |
|---|---|
| 00 | No aperiodic SRS resource set triggered |
| 01 | The 1st SRS resource set(s) indicated by MAC CE |
| 10 | The 2nd SRS resource set(s) indicated by MAC CE |
| 11 | The 3rd SRS resource set(s) indicated by MAC CE |

Updated by MAC CE

FIG. 12

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In NR, sounding reference signals (SRSs) have various usages. SRSs of NR are used not only for uplink (UL) CSI measurement but also downlink (DL) CSI measurement, beam management, and the like.

However, study about flexible control of an SRS parameter has not been advanced yet. Unless an SRS parameter is flexibly configured, resource usage efficiency, communication throughput, communication quality, and the like may deteriorate.

Thus, an object of the present disclosure is to provide a terminal, a radio communication method, and a base station that flexibly control an SRS parameter.

Solution to Problem

A terminal according to one aspect of the present disclosure includes: a receiving section that receives a medium access control-control element (MAC CE) related to a parameter for a sounding reference signal (SRS) resource set or an SRS resource; and a control section that controls SRS transmission, based on the parameter.

Advantageous Effects of Invention

According to one aspect of the present disclosure, it is possible to flexibly control an SRS parameter.

BRIEF DESCRIPTION OF DRAWINGS

FIG. 1 is a diagram to show an example of association between each value of a 2-bit SRS request field and SRS resource set(s);

FIG. 2 is a diagram to show an example of association between each value of a 1-bit SRS request field and an SRS resource set(s);

FIGS. 8A and 8B are diagrams to show an example of variation 1 of the MAC CE for mapping of each value of an SRS request field and a specific parameter(s) according to the third embodiment;

FIG. 12 is a diagram to show an example of option 2 of variation 3 according to the fourth embodiment;

DESCRIPTION OF EMBODIMENTS (SRS)

Figure 3:
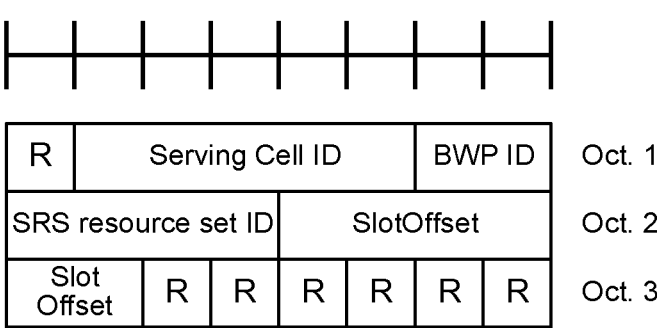
FIG. 3 is a diagram to show an example of MAC CE 1 according to a first embodiment.

In NR, sounding reference signals (SRSs) have various usages. SRSs of NR are used not only for uplink (UL) CSI measurement, for which SRSs are also used in existing LTE (LTE Rel. 8 to Rel. 14), but also downlink (DL) CSI measurement, beam management, and the like.

A UE may be configured with one or a plurality of SRS resources. Each SRS resource may be identified by an SRS resource index (SRI).

Each SRS resource may include one or a plurality of SRS ports (may correspond to one or a plurality of SRS ports). For example, the number of ports per SRS may be 1, 2, 4, or the like.

The UE may be configured with one or a plurality of SRS resource sets. One SRS resource set may be associated with a certain number of SRS resources. The UE may commonly use a higher layer parameter for the SRS resources included in one SRS resource set. Note that a resource set in the present disclosure may be interpreted as a set, a resource group, a group, and the like.

Information related to the SRS resource(s) or resource set(s) may be configured for the UE by using higher layer signaling or physical layer signaling, or a combination of these.

Note that, in the present disclosure, the higher layer signaling may, for example, be any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

SRS configuration information (for example, an RRC information element "SRS-Config") may include SRS resource set configuration information, SRS resource configuration information, and the like.

The SRS resource set configuration information (for example, an RRC parameter "SRS-ResourceSet") may include information of an SRS resource set ID (Identifier) (SRS-ResourceSetId), a list of SRS resource IDs (SRS-ResourceId) used in the resource set, an SRS resource type (resourceType), and SRS usage.

Here, the SRS resource type may indicate an SRS resource configuration time-domain behavior (same time domain behavior) and indicate any of a periodic SRS (P-SRS), a semi-persistent SRS (SP-SRS), and an aperiodic SRS (A-SRS). Note that the UE may periodically (or periodically after activation) transmit a P-SRS and an SP-SRS. The UE may transmit an A-SRS, based on an SRS request of DCI.

The SRS usage (an RRC parameter "usage," an L1 (Layer-1) parameter "SRS-SetUse") may, for example, be beam management (beamManagement), codebook (CB), non-codebook (NCB), antenna switching (antennaSwitching), or the like. For example, an SRS with codebook or non-codebook usage may be used for determination of precoder of codebook based or non-codebook based uplink shared channel (Physical Uplink Shared Channel (PUSCH)) transmission, based on an SRI.

For an SRS with beam management usage, it may be assumed that only one SRS resource can be transmitted in a certain time instant (given time instant) for each SRS resource set. Note that, when a plurality of SRS resources corresponding to the same time domain behavior belong to respective different SRS resource sets in the same Bandwidth Part (BWP), these SRS resources may be transmitted simultaneously.

The SRS resource configuration information (for example, an RRC parameter "SRS-Resource") may include an SRS resource ID (SRS-ResourceId), the number of SRS ports, an SRS port number, a transmission Comb, SRS resource mapping (for example, time and/or frequency resource location, a resource offset, resource periodicity, the number of repetitions, the number of SRS symbols, an SRS bandwidth, and the like), hopping related information, an SRS resource type, a sequence ID, spatial relation information, and the like.

The UE may switch a Bandwidth Part (BWP) or switch an antenna for transmitting an SRS, for each slot. The UE may employ at least one of intra-slot hopping and inter-slot hopping for SRS transmission.

(A-SRS Triggering)

An SRS request field for triggering an A-SRS is included in DCI formats 0_1, 0_2, 1_1, 1_2, and 2_3, for example.

As in the example in FIG. 1, each of three values 01, 10, and 11 other than the value 00 among the values of the 2-bit SRS request field (codepoints) is associated with (mapped to) one or more SRS resource sets.

The size of the SRS request field in each of DCI formats 0_2 and 1_2 may be zero, one, two, or three bits. As in the example in FIG. 2, a value 1 of the values of the 1-bit SRS request field (codepoints) is associated with (mapped to) one or more SRS resource sets.

The time between a trigger for the A-SRS and SRS transmission is a value k (slot offset) configured by RRC.

The SRS resource set information element (SRS-ResourceSet) includes a slot offset (slotoffset) and an A-SRS resource trigger list (aperiodicSRS-ResourceTriggerList) for the A-SRS. In other words, the slot offset and the A-SRS resource trigger list are configured for each SRS resource set. When no slot offset is configured, the UE uses no offset (value 0). The A-SRS resource trigger list includes one or more A-SRS resource trigger (aperiodicSRS-ResourceTrigger) information elements (states, IDs). Each A-SRS resource trigger indicates a DCI codepoint for transmitting the SRS according to the SRS resource set configuration including the A-SRS resource trigger.

It is preferable that flexibility of an SRS parameter be improved. For example, it is preferable to improve flexibility of A-SRS triggering so that a number of UEs can transmit SRSs in the same UL slot and triggering grants (pieces of DCI, PDCCHs each including an SRS request field) to these UEs are transmitted in a plurality of DL slots to distribute PDCCH load.

Unless flexibility of an SRS parameter is improved, resource usage efficiency, communication throughput, communication quality, and the like may deteriorate.

In view of this, the inventors of the present invention came up with the idea of a method of flexibly controlling an SRS parameter.

Embodiments according to the present disclosure will be described in detail with reference to the drawings as follows. The radio communication methods according to respective embodiments may each be employed individually, or may be employed in combination.

In the present disclosure, "A/B" and "at least one of A and B" may be interpreted interchangeably. In the present disclosure, a cell, a serving cell, a CC, a carrier, a BWP, a DL BWP, an UL BWP, an active DL BWP, an active UL BWP, and a band may be interpreted interchangeably. In the present disclosure, an index, an ID, an indicator, and a resource ID may be interpreted interchangeably. In the present disclosure, RRC, an RRC parameter, an RRC message, a higher layer parameter, an information element (IE), and a configuration may be interpreted interchangeably. In the present disclosure, support, control, can control, operate, and can operate may be interpreted interchangeably. In the present disclosure, a sequence, a list, a set, and a group may be interpreted interchangeably. In the present disclosure, mapping, an association, a relationship, and a table may be interpreted interchangeably.

In the present disclosure, activate, update, indicate, enable, and specify may be interpreted interchangeably.

In the present disclosure, a MAC CE, an update command, and an activation/deactivation command may be interpreted interchangeably.

In the present disclosure, the higher layer signaling may, for example, be any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the following embodiments, an SRS resource set/SRS resource may be interpreted as an SRS resource set/SRS resource for a specific usage (for example, codebook, non-codebook, beam management), an SRS resource set/SRS resource for the same usage, and the like, and vice versa.

(Radio Communication Method)

First Embodiment

An SRS resource set or a specific parameter configured for an (for each) SRS resource set may be controlled by a MAC CE. The specific parameter may be a parameter configured for each SRS resource set by RRC or may be a parameter configured for each SRS resource by RRC.

One value of the specific parameter may be notified by the RRC or the MAC CE. DCI need not necessarily be used for notification of the specific parameter.

The specific parameter may be a parameter (for example, a slot offset) for a time-domain/frequency-domain resource of the SRS.

The value of the specific parameter may follow any of notification methods 1 to 3 below.

{Notification Method 1}

The value of the specific parameter may be configured by the RRC and overwritten by the MAC CE. An RRC parameter for configuring the specific parameter may be the same as an RRC parameter in Rel. 15/16. A new MAC CE for updating the value of the specific parameter may be introduced.

{Notification Method 2}

A list of a plurality of values (candidates) for the specific parameter may be configured by the RRC, and the values (indices) in the list may be specified by the MAC CE. An RRC parameter for configuring the specific parameter may be different from an RRC parameter in Rel. 15/16. A new MAC CE for specifying the value of the specific parameter may be introduced.

{Notification Method 3}

The value of the specific parameter need not necessarily be configured by the RRC. The value of the specific parameter may be (directly) specified by the MAC CE. An RRC parameter for configuring the specific parameter may be an optional field of Rel. 15/16. A new MAC CE for specifying the value of the specific parameter may be introduced. When no RRC parameter for configuring the specific parameter is configured, the value of the specific parameter may be 0 (may be regarded as 0 (no offset)).

The new MAC CE may be either of MAC CEs 1 and 2 below.

<<MAC CE 1>>

The new MAC CE may update/indicate/notify the specific parameter in the SRS resource set.

The new MAC CE may follow either of notification methods 1 and 3 described above.

In the example in FIG. 3, the new MAC CE may include at least one of a reserved (R) field (reserved bit), a serving cell ID field, a BWP ID field, an SRS resource set ID field, and a slot offset field. When the value of the slot offset is in the range from 0 to 32, the size of the slot offset field may be six bits. In Rel. 15, when no slot offset is configured, the value of the slot offset is 0. In this example, when no slot offset is configured, the value of the slot offset may be a value notified by the MAC CE.

The new MAC CE may follow at least one of variations 1 and 2 below.

{Variation 1}

Figure 4A:
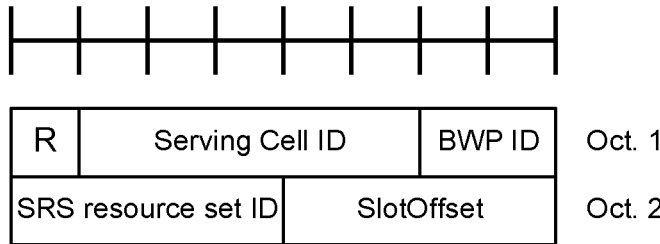
FIGS. 4A and 4B are diagrams to show an example of a variation of MAC CE 1 according to the first embodiment.

The size of the slot offset field may be smaller than six bits. As in the example in FIG. 4A, the size of the slot offset field may be four bits, and the value of the slot offset notified by the MAC CE may be in the range from 0 to 15. Consequently, the number of octets (overhead) of the MAC CE can be reduced.

{Variation 2}

Figure 4B:
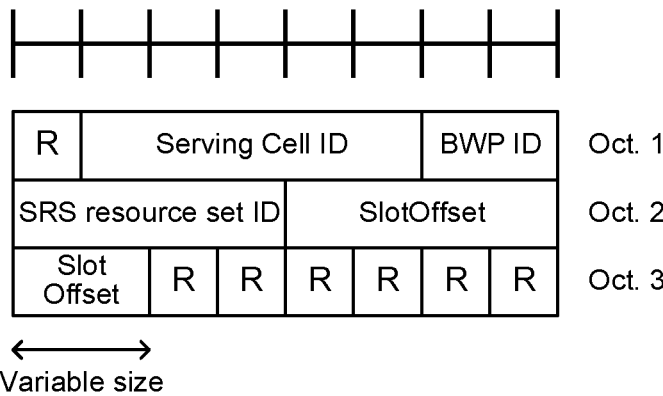

The size of the slot offset field may be variable. The size of the slot offset field may be based on the RRC parameter. In the example in FIG. 4B, the number of bits used for the slot offset field in octet 3 is variable.

An RRC parameter for determining the size (number of bits) of the slot offset field may be configured. The RRC parameter may indicate the maximum value of the value of the slot format indicated by the MAC CE. For example, in a case where the RRC parameter indicates 15, a value in the range from 0 to 15 may be indicated by the MAC CE and the size of the slot offset field may be four bits.

The RRC parameter may indicate the minimum value of the value of the slot format indicated by the MAC CE. The maximum value of the value of the slot format indicated by the MAC CE may be defined in a specification. For example, in a case where the RRC parameter indicates 15 and the maximum value is 32, a value in the range from 15 to 32 may be indicated by the MAC CE and the size of the slot offset field may be five bits.

The RRC parameter may indicate the size of the slot format indicated by the MAC CE. For example, in a case where the RRC parameter indicates 3, the size of the slot offset field may be three bits.

<<MAC CE 2>>

The new MAC CE may update/indicate/notify the specific parameter in the SRS resource set. One or a plurality of candidates for the specific parameter notified by the MAC CE may be configured by the RRC parameter.

The RRC parameter may be a bitmap. In the bitmap, the location of each bit set to 1 may correspond to a candidate for the specific parameter. For example, the range of the value of the slot offset may be from 0 to 32, and the size of the bitmap may be 33 bits. The MAC CE may indicate the value of the specific parameter by using an index (list index) corresponding to the location of the bit set to 1.

Figures 5A, 5B:
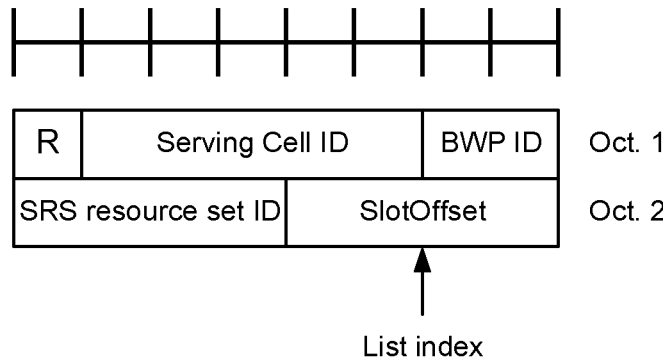
FIGS. 5A and 5B are diagrams to show an example of MAC CE 2 according to the first embodiment.

As in the example in FIG. 5A, the number of candidates configured by the RRC parameter may be 16 or less in the range of the values of the slot offset from 0 to 32. In this case, as in the example in FIG. 5B, the list index specified by the slot offset field may be from 1 to 16 (or from 0 to 15), and the size of the slot offset field may be four bits. Consequently, the number of octets (overhead) of the MAC CE can be reduced.

The RRC parameter may be a sequence (list) of the candidates for the specific parameter. One value in the list may be notified by the MAC CE.

The maximum number of candidates may be defined in a specification or may be configured by higher layer signaling.

According to the first embodiment above, it is possible to indicate an SRS resource set or an SRS resource by a MAC CE.

Second Embodiment

A specific parameter configured for an (for each) SRS resource set or SRS resource may be controlled by at least one of a MAC CE and DCI.

One value of the specific parameter may be notified by the RRC or the MAC CE. DCI need not necessarily be used for notification of the specific parameter.

The specific parameter may be a parameter (for example, a slot offset) for a time-domain/frequency-domain resource of the SRS.

The value of the specific parameter may follow any of notification methods 1 to 3 above and notification 4 below. {Notification Method 4}

A plurality of values (plurality of candidates, list) of the specific parameter may be notified/activated by at least one of the RRC and the MAC CE. One of the plurality of values may be indicated by DCI.

A new field in the DCI (DCI field) for indicating the specific parameter may be defined/added. When an RRC parameter (for example, a Rel-17 RRC parameter) is configured, the new DCI field may be present in the DCI. Otherwise, the new DCI field may be absent in the DCI.

For the specific parameter, a value of a new parameter may be notified by an existing DCI field (of Rel. 15/16). Consequently, changes in specifications can be minimized.

The existing DCI field may be an SRS request field. The changes in specification may be increasing the number of SRS resource sets with a specific usage.

The existing DCI field may be a time domain resource assignment (TDRA) field or a CSI request field in a UL grant (DCI for scheduling a PUSCH) or may be a TDRA field in a DL assignment (DCI for scheduling a PDSCH).

The slot offset may be the sum of a slot(s) indicated by the TDRA field in the UL grant and a K slot(s) (indicated slot(s)+K slot(s)) or the difference between the indicated slot(s) and the K slot(s) (indicated slot(s)−K slot(s)). The slot offset may be the sum of a slot(s) indicated by the CSI request field in the UL grant and the K slot(s) (indicated slot(s)+K slot(s)) or the difference between the indicated slot(s) and the K slot(s) (indicated slot(s)−K slot(s)). The slot offset may be the sum of a slot(s) indicated by the TDRA field in the DL assignment and the K slot(s) (indicated slot(s)+K slot(s)) or the difference between the indicated slot(s) and the K slot(s) (indicated slot(s)−K slot(s)). K may be defined in a specification or may be configured by higher layer signaling. K may be 0 or may be another value.

<<Number of Configurable SRS Resource Sets>>

In Rel. 15/16, only one SRS resource set is configured for an SRS resource set with codebook transmission (codebook) or non-codebook transmission (nonCodebook) usage by a higher layer parameter. In Rel. 15/16, the number (maximum number) of configurable SRS resource sets is determined for an SRS resource set with antenna switching (antennaSwitching) usage according to UE capability reported by the UE. For example, a plurality of SRS resource sets correspond to respective different slots, and antenna switching of an SRS is performed over a plurality of slots. In UE capability of Rel. 17, at least one of 1T (transmission antenna) 6R (reception antenna), 1T8R, 2T6R, 2T8R, 4T6R, and 4T8R may be added.

When no new RRC parameter is configured for an SRS resource set with codebook transmission, non-codebook transmission or antenna switching usage, a restriction of the number (maximum number) of configurable SRS resource sets in Rel. 15/16 may be applied.

When the new RRC parameter is configured, the number of configurable SRS resource sets may be larger than the number (maximum number) of configurable SRS resource sets in Rel. 15/16. For each of codebook transmission, non-codebook transmission, and antenna switching, the maximum number of SRS resource sets corresponding to one codepoint in the SRS request field in the DCI may be the number (maximum number) of configurable SRS resource sets in Rel. 15/16. The one codepoint in the SRS request field may be one value (ID) of an A-SRS resource trigger (aperiodicSRSResourceTrigger) configured by higher layer signaling.

For example, the slot offset can be controlled by the DCI (SRS request field), and also the SRS antenna switching over the plurality of slots can be performed by the one DCI codepoint.

According to the second embodiment above, it is possible to indicate an SRS resource set or an SRS resource by DCI.

Third Embodiment

The specific parameter may be an SRS resource set or an A-SRS resource trigger.

<<Activation/Deactivation of SRS Resource Set>>

A plurality of SRS resource sets may be configured by RRC, and some of the plurality of SRS resource sets may be activated/deactivated by a MAC CE. The restriction of the number of SRS resource sets described above may be applied to the number of active SRS resource sets.

The MAC CE may include a field indicating an SRS resource set ID to be activated.

Figure 6A:
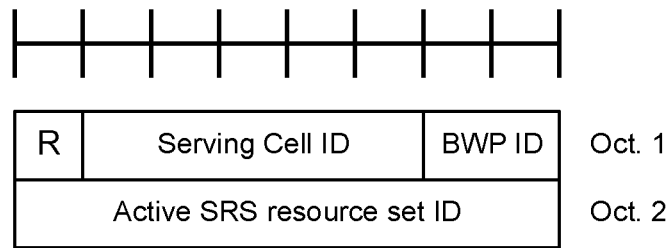
FIGS. 6A and 6B are diagrams to show an example of a MAC CE for activation/deactivation of an SRS resource set according to a third embodiment.

As in the example in FIG. 6A, the MAC CE may include at least one of an R field, a serving cell ID field, a BWP ID field, and an active SRS resource set ID field. The MAC CE may include a plurality of active SRS resource set ID fields. A plurality of SRS resource sets may be activated simultaneously. Each of a plurality of octets in the MAC CE may include one active SRS resource set ID field.

Figure 6B:
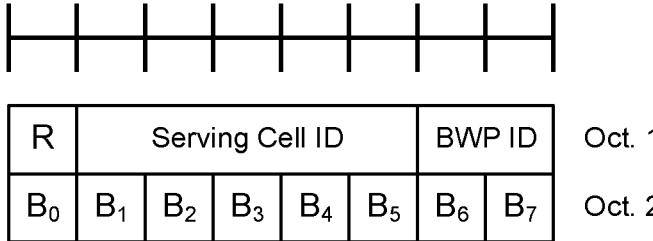

As in the example in FIG. 6B, the MAC CE may include at least one of an R field, a serving cell ID field, a BWP ID field, and $B_x$ fields. Each $B_x$ field may be a bitmap. A plurality of SRS resource sets may be activated simultaneously. Association between each value x and an SRS resource set ID may be configured by higher layer signaling. The values x may be associated in an ascending order of SRS resource set IDs. The $B_x$ fields may be mapped over a plurality of octets according to the number of SRS resource sets configured by the higher layer signaling. The number of octets may be variable according to the number of SRS resource sets configured by higher layer signaling. The order of the $B_x$ fields may be an ascending order of x or may be a descending order of x.

<<Value of SRS Resource Set ID or A-SRS Resource Trigger>>

A correspondence relationship between the codepoint of the SRS request field and the value of the SRS resource set ID (or an A-SRS resource trigger) may be notified/updated by the new MAC CE. Mapping between the DCI codepoint and one or a plurality of SRS resource sets may be notified/updated by the new MAC CE.

Figures 7A, 7B:
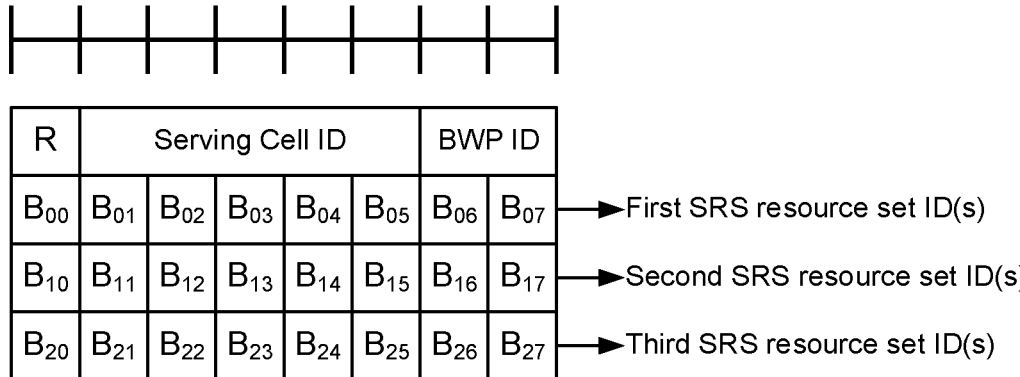
FIGS. 7A and 7B are diagrams to show an example of a MAC CE for mapping of each value of an SRS request field and a specific parameter(s) according to the third embodiment.

As in the example in FIG. 7A, a relationship (for example, a table) between each codepoint of the SRS request field and the content of the MAC CE may be defined in a specification. The value 00 of the SRS request field may indicate that no A-SRS resource set is triggered. The values 01, 10, and 11 of the SRS request field may indicate that respective SRS resource sets indicated by the first, second, and third SRS resource set IDs notified by the MAC CE are triggered.

The UE that has received this MAC CE may determine the value of the SRS resource set or the A-SRS resource trigger corresponding to the value of the SRS request field, based on the correspondence relationship indicated by the MAC CE, instead of the table defined in Rel. 15/16.

As in the example in FIG. 7B, the new MAC CE may include at least one of an R field, a serving cell ID field, a BWP ID field, and $B_{yx}$ fields. Each $B_{yx}$ field may be a bitmap. A plurality of SRS resource sets may be activated simultaneously. Association between values y and x and an SRS resource set ID may be configured by higher layer signaling. The $B_{yx}$ field may be associated with the y-th SRS resource set ID. The values x may be associated in an ascending order of SRS resource set IDs. The values y may be associated in an ascending order of SRS resource set IDs. The $B_{yx}$ fields may be mapped over a plurality of octets according to the number of SRS resource sets configured by the higher layer signaling. The number of octets may be variable according to the number of SRS resource sets configured by higher layer signaling. The order of the $B_{yx}$ fields may be an ascending order of x, may be a descending order of x, may be an ascending order of y, or may be a descending order of y.

In this example, the location of one bit set to 1 in octet 2 may indicate the first SRS resource set ID (corresponding to the value 01 of the SRS request field), the location of one bit set to 1 in octet 3 may indicate the second SRS resource set ID (corresponding to the value 10 of the SRS request field), and the location of one bit set to 1 in octet 4 may indicate the third SRS resource set ID (corresponding to the value 11 of the SRS request field).

{Variation 1}

The new MAC CE may include a field indicating whether each SRS resource set ID is associated with the value of the SRS request field.

As in the example in FIG. 8A, the new MAC CE may include at least one of an R field, a serving cell ID field, a BWP ID field, $T_i$ fields, and $B_x$ fields. Each $T_i$ field may be associated with a plurality of $B_x$ fields. When the $T_i$ field is set to 1, the seven subsequent $B_x$ fields may be present. When the $T_i$ field is set to 0, the seven subsequent $B_x$ fields may be absent.

When at least one $T_i$ field is 0, the SRS resource set IDs specified by the MAC CE may be associated in an ascending or descending order of the values of the SRS request field. For example, when two $T_i$ fields are set to 1 as in the example in FIG. 8A, two values of the SRS request field may be associated with the SRS resource set IDs indicated by the MAC CE sequentially from the maximum value 11 (from the lowermost row of the table) of the value of the SRS request field as in the example in FIG. 8B. The remaining values of the SRS request field may follow association (table) in Rel. 15/16.

{Variation 2}

One or more SRS resource set ID lists may be configured by RRC. Each SRS resource set ID list may include one or more groups of SRS resource sets. Each group may include one or more SRS resources. An index (list index, group index) may be associated with each group. The list index may be notified by the MAC CE.

Figures 9A, 9B:
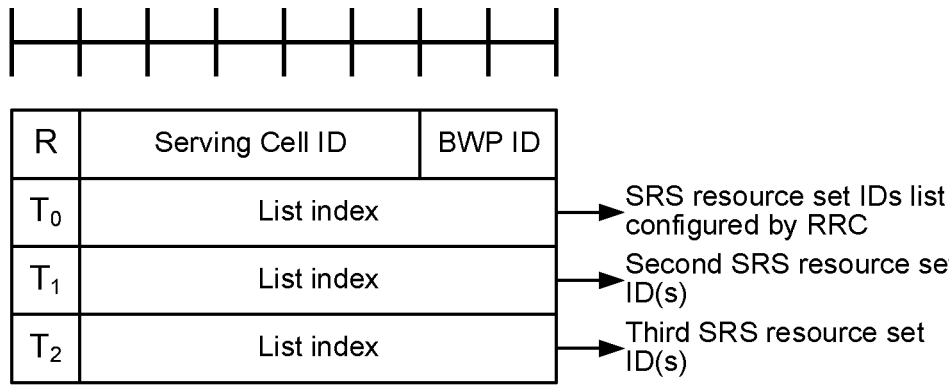
FIGS. 9A and 9B are diagrams to show an example of variation 2 of the MAC CE for mapping of a value of an SRS request field and a specific parameter according to the third embodiment.

As in the example in FIG. 9A, the SRS resource set ID list including four groups is configured by RRC. The respective four groups correspond to list indices 0 to 3.

As in the example in FIG. 9B, the new MAC CE may include at least one of an R field, a serving cell ID field, a BWP ID field, $T_i$ fields, and list index fields. Each $T_i$ field may be associated with one list index field. When the $T_i$ field is set to 1, the one subsequent list index field may be present. When the $T_i$ field is set to 0, the one subsequent list index field may be absent.

Each list index field may indicate a list index. In this example, the list index field in octet 2 may indicate the first group of the SRS resource set IDs (corresponding to the value 01 of the SRS request field), the list index field in octet 3 may indicate the second group of SRS resource set IDs (corresponding to the value 10 of the SRS request field), and the list index field in octet 4 may indicate the third group of the SRS resource set IDs (corresponding to the value 11 of the SRS request field).

When the size of the SRS request field is N bits, the number of list index fields in the MAC CE may be $2^N-1$ or may be smaller than $2^N-1$. When the number of list index fields in the MAC CE is smaller than $2^N-1$, the groups indicated by the list index field may be associated with the values of the SRS request field sequentially from the maximum value 11 (from the lowermost row of the table) of the values of the SRS request field, similarly to FIGS. 8A and 8B. The remaining values of the SRS request field may follow association (table) in Rel. 15/16.

<<Value of A-SRS Resource Trigger>>

The value of the A-SRS resource trigger of the SRS resource set (A-SRS resource trigger ID, for example, any of 1, 2, and 3) may be notified by the MAC CE.

A relationship (table) between the value of the SRS request field and the SRS resource set ID need not necessarily be defined in a specification. An existing relationship (table) between the value of the SRS request field and the SRS resource set may be used.

For a plurality of SRS resource sets, the same value of the A-SRS resource trigger may be configured (especially when the usage is antenna switching).

The value of the A-SRS resource trigger may follow at least one of operations 1 and 2 below.

{Operation 1}

Only for each SRS resource set notified by the MAC CE, the value of the A-SRS resource trigger may be updated. Consequently, the value of the A-SRS resource trigger can be flexibly indicated by the MAC CE.

{Operation 2}

When the value of the A-SRS resource trigger is notified by the MAC CE, the values of the A-SRS resource trigger of all the SRS resource sets configured with the same value as that of the A-SRS resource trigger before the notification may be updated. Consequently, overhead of the MAC CE can be reduced.

A combination of SRS resource sets to be updated by one MAC CE may be configured by a higher layer parameter (for example, an applicable SRS resource set list). Only when this higher layer parameter is configured, operation 2 may be performed.

Operation 2 is not limited to notification of an A-SRS resource trigger ID. Operation 2 may be applied to a parameter updated by the MAC CE for each SRS resource set.

Figure 10:
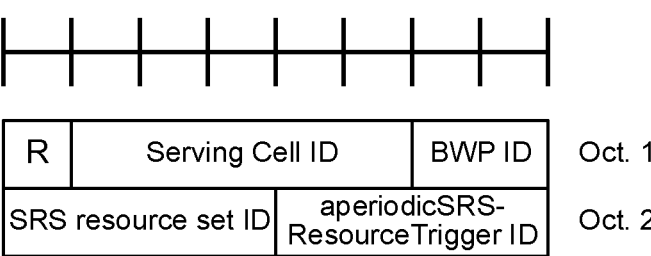
FIG. 10 is a diagram to show an example of a MAC CE indicating an A-SRS resource trigger according to the third embodiment.

As in FIG. 10, the new MAC CE may include at least one of an R field, a serving cell ID field, a BWP ID field, and an SRS resource set ID, and an A-SRS resource trigger ID field.

The A-SRS resource trigger ID field may overwrite a value configured by RRC. An A-SRS resource trigger ID list may be configured by RRC, and the index (location) in the list may be specified by the A-SRS resource trigger ID field of the MAC CE. When one A-SRS resource trigger ID is not notified by RRC, notification of an A-SRS resource trigger ID using a MAC CE may be employed.

<<Triggering DCI>>

An SRS request field for triggering an A-SRS may be included in UL grant (UL DCI)/DL assignment (DL DCI).

Existing UL/DL DCI cannot trigger an A-SRS without scheduling of a PUSCH/PDSCH.

When a condition is satisfied, the SRS request field included in UL/DL DCI may be used for selection of a parameter for an SRS resource set/SRS resource. The condition may be that a specific RRC parameter is received. Consequently, it is possible to more flexibly control an A-SRS without changing the size of existing DCI field size.

A new radio network temporary identifier (RNTI) for triggering an A-SRS may be defined (for example, an SRS-RNTI). DCI with cyclic redundancy check (CRC) scrambled with an SRS-RNTI may be used only for triggering of an A-SRS (no scheduling is needed). When such a new RNTI is defined, an increase in the number of blind detections can be prevented compared with that in a case of defining a new DCI format.

A new DCI format for triggering an A-SRS may be defined.

A DCI format to be used for triggering an A-SRS may be a specific DCI format. The specific DCI format may be a DCI format capable of triggering an A-SRS among existing DCI formats.

Selection of a parameter for an SRS resource set/SRS resource may be performed by using a mechanism of interpreting the fields other than the SRS request field as appropriate to trigger an SRS by an SRS request field. The value 00 of the existing SRS request field indicates that no SRS is triggered. The DCI with CRC scrambled with the SRS-RNTI does not require a state of not triggering an SRS. The value 00 of the SRS request field in the DCI with CRC scrambled with the SRS-RNTI may be associated with an SRS resource set.

The size of the SRS request field in the DCI with CRC scrambled with the SRS-RNTI may be four bits or more without being limited to two bits or three bits.

In association (table) between an SRS request field and an SRS resource set (or an A-SRS resource trigger) in Rel. 15/16, the SRS resource set may be associated with the value 00 of the SRS request field. For the value 00 of the SRS request field, a triggered A-SRS resource set(s) for DCI formats 0_1, 0_2, 1_1, 1_2, and 2_3 configured with a higher layer parameter SRS-TPCPDCCH group (srs-TPC-PDCCH-Group) set to type B may be an SRS resource set(s) configured with a higher layer parameter A-SRS resource trigger set to 1 or one entry set to 1 in the higher layer parameter A-SRS resource trigger list. For the value 00 of the SRS request field, an A-SRS resource set triggered for DCI format 2_3 configured with the higher layer parameter SRS-TPCPDCCH group (srs-TPC-PDCCH-Group) set to type A may be an SRS resource set(s) configured with usage (higher layer parameter "usage") (in the SRS resource set) set to antenna switching and resource type (in the SRS resource set) set to "aperiodic" for a first set of serving cells configured by higher layers or an SRS resource set(s) configured by an SRS resource set for positioning and with resource type (in the SRS resource set for positioning) set to "aperiodic" for a first set of serving cells configured by higher layers.

In this case, a DCI field(s) indicating one or a plurality of SRS resource sets to be triggered may be present, and the UE may transmit an A-SRS(s) corresponding to one or a plurality of SRS resource sets indicated by the field(s).

A plurality of values (candidates) of the slot offset may be notified by RRC/a MAC CE, a DCI field indicating one of the plurality of values may be present, and the UE may transmit an A-SRS by using the slot offset indicated by the field.

According to the third embodiment above, it is possible to notify an SRS resource set(s) by a MAC CE/DCI.

Fourth Embodiment

<<Variation 1>>

When an SRS resource set or a specific parameter configured for an (each) SRS resource set is indicated by DCI, at least one of MAC CE fields according to the first to third embodiments may be enhanced, and a plurality of candidates of an SRS resource set/SRS resource/SRS parameter may be activated by the field, to indicate one of the plurality of candidates by DCI.

<<Variation 2>>

At least one of the first to third embodiments may be applied only when corresponding UE capability is reported by the UE.

The UE capability may indicate whether at least one of the first to third embodiments is supported.

The UE capability may indicate the number (maximum number) of SRS resource sets/SRS resources supported in at least one of the first to third embodiments.

The UE capability may indicate the number (maximum number) of SRS resource sets/SRS resources that can be controlled by a MAC CE/DCI according to at least one of the first to third embodiments.

At least one of the first to third embodiments may be applied only when the UE is configured with a corresponding higher layer parameter. Otherwise, the UE may perform operation in Rel. 15/16.

<<Variation 3>>

To increase flexibility of an A-SRS, at least one of enhancements 1 and 2 below may be considered.

{Enhancement 1}

Enhancement with a MAC CE being introduced. This enhancement may follow at least one of options 1 and 3 below.

{{Option 1}}

The MAC CE may activate one or a plurality of SRS resource sets. Only an active SRS resource set(s) may be triggered by the SRS request field of the DCI.

Figure 11:
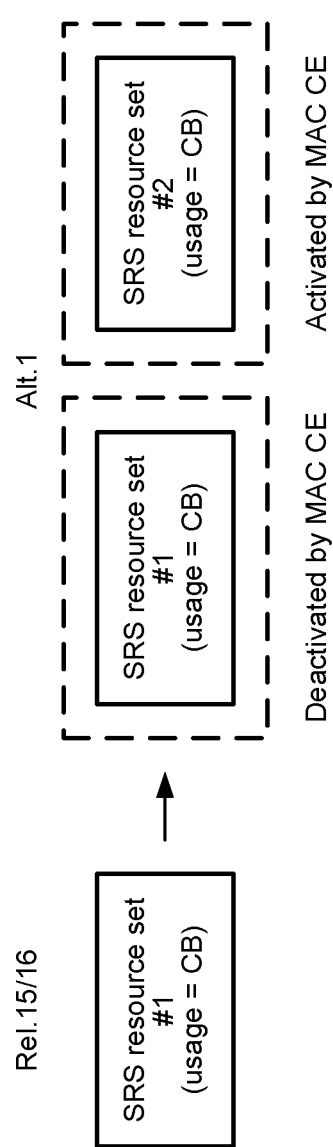
FIG. 11 is a diagram to show an example of option 1 of variation 3 according to a fourth embodiment.

As in the example in FIG. 11, SRS resource set #1 with codebook usage is configured in Rel. 15/16. In Option 1, SRS resource sets #1 and #2 with codebook usage may be configured, and SRS resource set #2 may be activated by a MAC CE.

{{Option 2}}

The MAC CE may update mapping between the DCI codepoint and an A-SRS resource trigger.

As in the example in FIG. 12, an A-SRS resource trigger is associated with each of the values other than 00 of a 2-bit SRS request field in Rel. 15/16. In Option 2, one or more SRS resource set IDs indicated by the MAC CE may be associated with each of the values other than 00 of a 2-bit SRS request field.

{{Option 3}}

The MAC CE may update a specific parameter of the SRS. For example, the specific parameter may be a slot offset.

Figure 13:
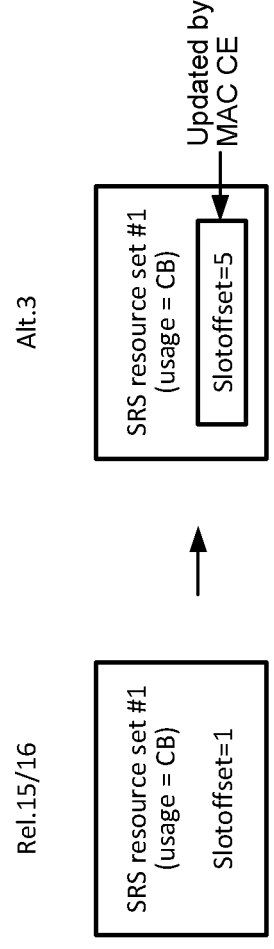
FIG. 13 is a diagram to show an example of option 3 of variation 3 according to the fourth embodiment.

As in the example in FIG. 13, SRS resource set #1 with codebook usage and slot offset being equal to 1 (=1) is configured in Rel. 15/16. In option 3, the MAC CE may update the slot offset of SRS resource set #1.

In option 1/2, the number (maximum number) of SRS resource sets that can be configured for given usage increases.

{Enhancement 2}

Enhancement of triggering DCI.

The number of bits of the SRS request field may be increased.

A new DCI field may be added in addition to the SRS request field.

A new RNTI (for example, an SRS-RNTI) for forming DCI dedicated to A-SRS triggering (for example, SRS-RNTI) may be introduced.

A new DCI format for forming DCI dedicated to A-SRS triggering may be introduced.

An existing DCI field for controlling SRS triggering may be reused in addition to the SRS request field.

<<Variation 4>>

A MAC CE activation time for applying the MAC CE according to at least one of the first to third embodiments may be required.

The UE may follow at least one of operations 1 and 2 below.

{Operation 1}

The UE uses an SRS resource (parameter) updated by the MAC CE, for SRS transmission triggered by DCI received after the elapse of the MAC CE activation time since the MAC CE is received.

{Operation 2}

The UE uses an SRS resource (parameter) updated by the MAC CE, for SRS transmission after the elapse of the MAC CE activation time since the MAC CE is received.

The MAC CE activation time may be different among an A-SRS, an SP-SRS, and a P-SRS. For example, in operation 1, the MAC CE activation time for an S-SRS may be a three-subframe time (3 msec), and the MAC CE activation time for an SP/P-SRS may be a three-subframe time (3 msec)+T. T may be defined in a specification, may be configured by a higher layer, or may be reported by UE capability.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 14:
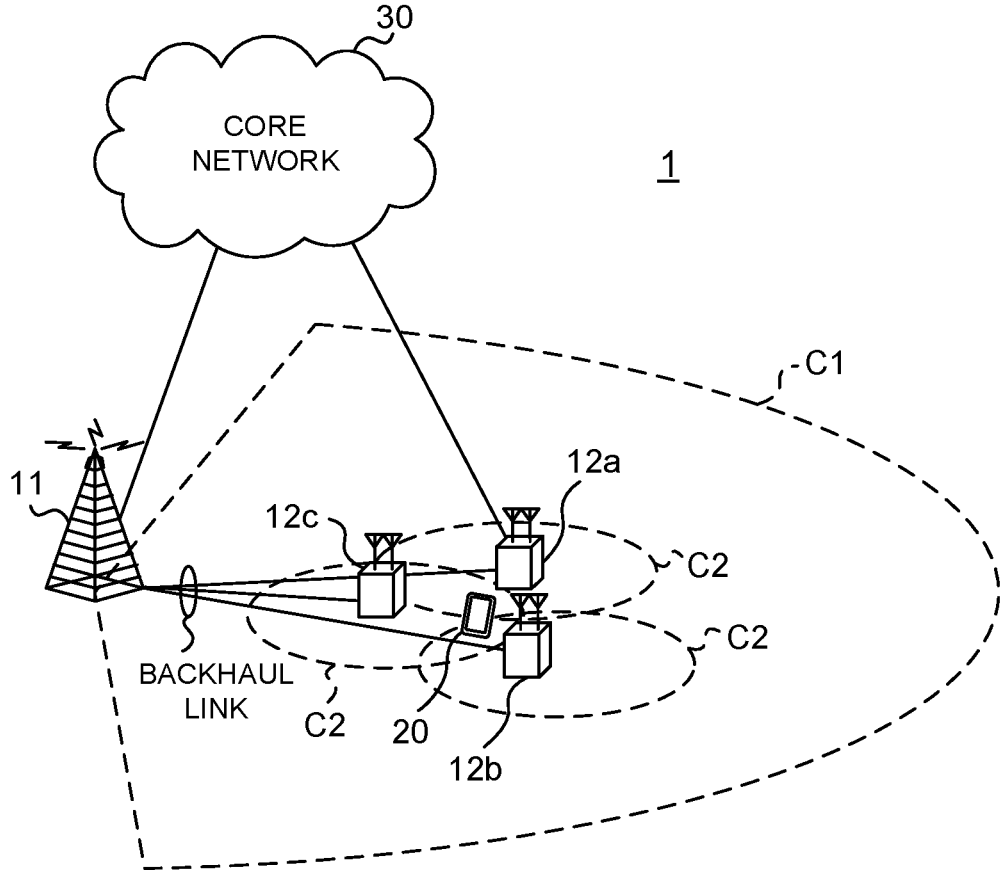
FIG. 14 is a diagram to show an example of a schematic structure of a radio communication system according to one embodiment.

FIG. 14 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 15:
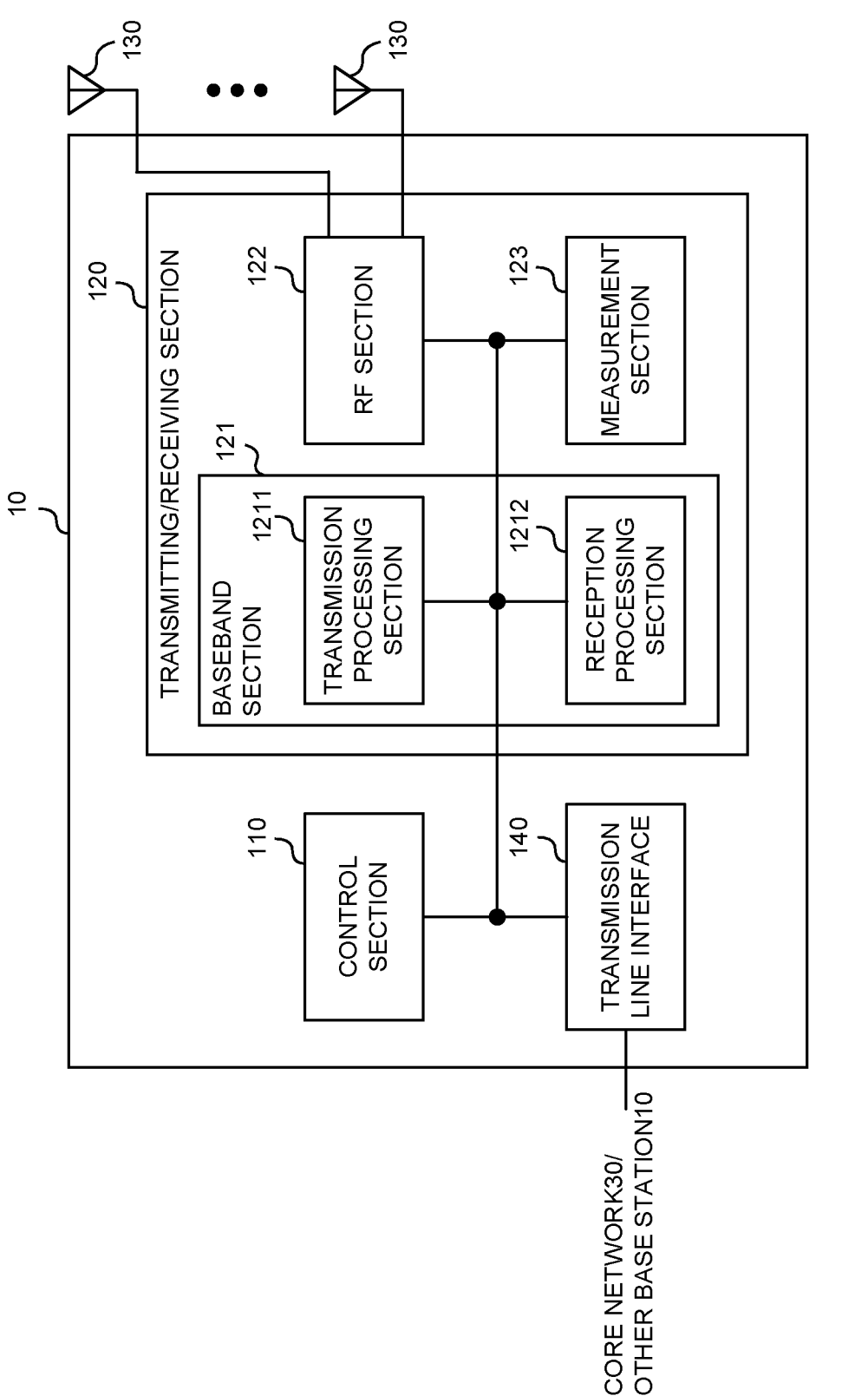
FIG. 15 is a diagram to show an example of a structure of a base station according to one embodiment.

FIG. 15 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit a medium access control-control element (MAC CE) related to a parameter for a sounding reference signal (SRS) resource set or an SRS resource. The control section 110 may control SRS reception, based on the parameter.

The transmitting/receiving section 120 may transmit a medium access control-control element (MAC CE) indicating mapping between one or more values of a parameter for the sounding reference signal (SRS) resource set or the SRS resource and one or more values of a field in downlink control information, and transmit the downlink control information. The control section 110 may control SRS reception, based on the parameter.

(User Terminal)

Figure 16:
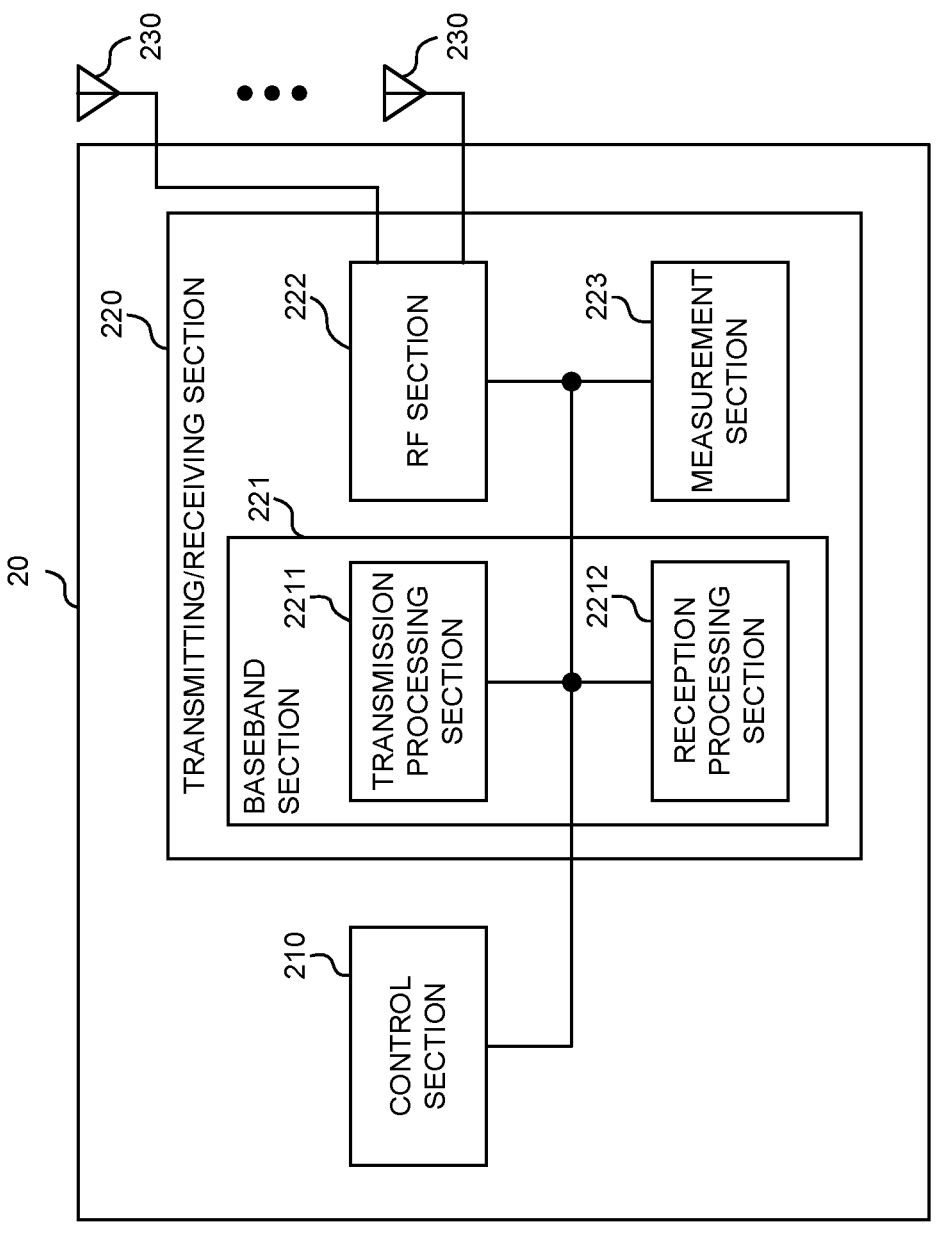
FIG. 16 is a diagram to show an example of a structure of a user terminal according to one embodiment.

FIG. 16 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive a medium access control-control element (MAC CE) related to a parameter for a sounding reference signal (SRS) resource set or an SRS resource. The control section 210 may control SRS transmission, based on the parameter.

The transmitting/receiving section 220 may receive a radio resource control information element indicating a plurality of SRS resource sets. The MAC CE may activate one or more SRS resource sets among the plurality of SRS resource sets.

The transmitting/receiving section 220 may receive a radio resource control information element indicating the parameter. The MAC CE may update the parameter.

The parameter may indicate a slot offset for the SRS resource set.

The transmitting/receiving section 220 may receive a medium access control-control element (MAC CE) indicating mapping between one or more values of a parameter for the sounding reference signal (SRS) resource set and the SRS resource and one or more values of a field in downlink control information, and receive the downlink control information. The control section 210 may determine a value of the parameter, based on the MAC CE and the downlink control information.

The parameter may be at least one of an aperiodic SRS resource trigger and an SRS resource set.

The MAC CE may indicate a plurality of SRS resource sets. A plurality of values of the field may be mapped to the plurality of SRS resource sets.

The downlink control information may be transmitted by using at least one of a radio network temporary identifier for an SRS and a downlink control information format for an SRS.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 17:
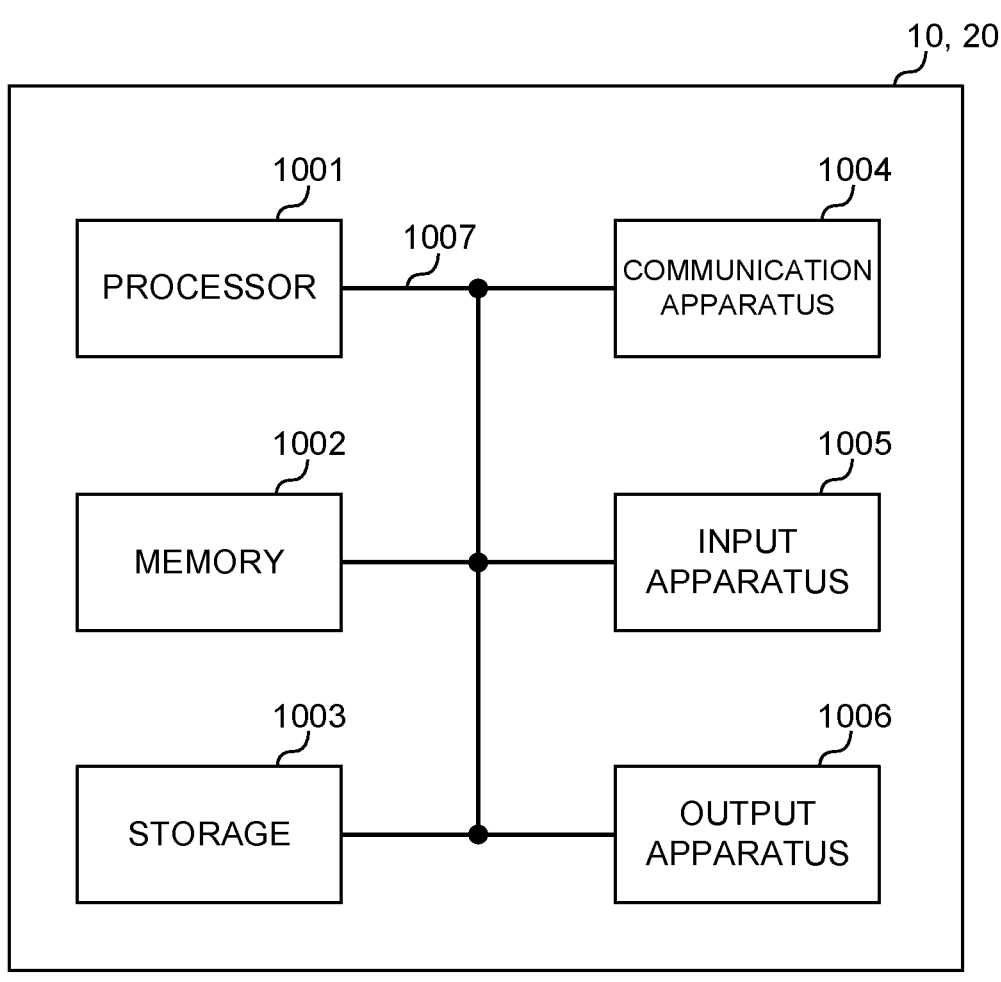
FIG. 17 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 17 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAN), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain channel/signal outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements.

These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:

a processor that controls transmission of a report on capability information indicating a capability of antenna switching for more than four reception antennas; and a receiver that receives a configuration that indicates values for a slot offset of an aperiodic sounding reference signal (SRS) resource set having a usage of the antenna switching and depends on the capability information, and receives a downlink control information indicating one of the values, wherein the processor determines, based on the configuration and the downlink control information, a slot of transmission of an SRS in the aperiodic SRS resource set.

2. The terminal according to claim 1, wherein the capability information indicates at least one of:

a capability of antenna switching for one transmission antenna and six reception antennas;

a capability of antenna switching for two transmission antennas and six reception antennas;

a capability of antenna switching for four transmission antennas and six reception antennas;

a capability of antenna switching for one transmission antenna and eight reception antennas;

a capability of antenna switching for two transmission antennas and eight reception antennas; and a capability of antenna switching for four transmission antennas and eight reception antennas.

3. The terminal according to claim 1, wherein the capability information indicates a maximum number of multiple SRS resource sets that is configured for the terminal having the capability of antenna switching for more than four reception antenna, and the maximum number is greater than another maximum number of SRS resource sets that is configured for another terminal that does not have the capability of antenna switching for more than four reception antennas.

4. A radio communication method for a terminal, comprising:

controlling transmission of a report on capability information indicating a capability of antenna switching for more than four reception antennas;

receiving a configuration that indicates values for a slot offset of an aperiodic sounding reference signal (SRS) resource set having a usage of the antenna switching and depends on the capability information;

receiving a downlink control information indicating one of the values; and determining, based on the configuration and the downlink control information, a slot of transmission of an SRS in the aperiodic SRS resource set.

5. A base station comprising:

a processor that controls reception of a report on capability information indicating a capability of antenna switching for more than four reception antennas; and a transmitter that transmits a configuration that indicates values for a slot offset of an aperiodic sounding reference signal (SRS) resource set having a usage of the antenna switching and depends on the capability information, and transmits a downlink control information indicating one of the values, wherein the processor determines, based on the configuration and the downlink control information, a slot of reception of an SRS in the aperiodic SRS resource set.

6. A system comprising a terminal and a base station, wherein the terminal comprising:

a processor that controls transmission of a report on capability information indicating a capability of antenna switching for more than four reception antennas; and a receiver that receives a configuration that indicates values for a slot offset of an aperiodic sounding reference signal (SRS) resource set having a usage of the antenna switching and depends on the capability information, and receives a downlink control information indicating one of the values, wherein the processor determines, based on the configuration and the downlink control information, a slot of transmission of an SRS in the aperiodic SRS resource set, and the base station transmits the configuration and transmits the downlink control information.

* * * * *